United States Patent
Flynn et al.

(10) Patent No.: US 8,208,591 B2
(45) Date of Patent: Jun. 26, 2012

(54) METHOD AND APPARATUS FOR PERFORMING ADAPTIVE EQUALIZATION

(75) Inventors: James P. Flynn, Beaverton, OR (US); Junqi Hua, Portland, OR (US); Robert B. Lefferts, Portland, OR (US); Richard H. Steeves, Portland, OR (US); John T. Stonick, Portland, OR (US); Daniel K. Weinlader, Allentown, PA (US); Jianping Wen, Beaverton, OR (US); Skye Wolfer, Hillsboro, OR (US); David A. Yokoyama-Martin, Portland, OR (US)

(73) Assignee: Synopsys, Inc., Mountain View, CA (US)

( * ) Notice: Subject to any disclaimer, the term of this patent is extended or adjusted under 35 U.S.C. 154(b) by 193 days.

(21) Appl. No.: 12/819,629

(22) Filed: Jun. 21, 2010

(65) Prior Publication Data
US 2011/0310947 A1   Dec. 22, 2011

(51) Int. Cl.
*H04B 1/10* (2006.01)
(52) U.S. Cl. ........ 375/350; 375/229; 375/232; 375/371; 375/376

(58) Field of Classification Search .......... 375/229–236, 375/346–350, 371–376
See application file for complete search history.

(56) References Cited

U.S. PATENT DOCUMENTS
7,639,737 B2 * 12/2009 Palmer .......................... 375/232
* cited by examiner

*Primary Examiner* — Curtis Odom
(74) *Attorney, Agent, or Firm* — Park, Vaughan, Fleming & Dowler LLP; Laxman Sahasrabuddhe

(57) ABSTRACT

Systems and techniques for adapting and/or optimizing an equalizer of a receiver are described. The equalizer's behavior can be adjusted by modifying one or more equalization parameters. At the beginning of the adaptation and/or optimization process, the system can determine robust initial values for the one or more equalization parameters. The system can then adapt and/or optimize the equalizer by iteratively adjusting the one or more equalization parameters. Specifically, in each iteration, the system can use the receiver's clock and data recovery (CDR) circuitry to determine the number of early and late data transitions associated with one or more data patterns. Next, the system can adjust the one or more equalization parameters so that, for each data pattern in the one or more data patterns, the ratio between the number of early data transitions and the number of late data transitions is substantially equal to a desired value.

21 Claims, 5 Drawing Sheets

METHOD AND APPARATUS FOR PERFORMING ADAPTIVE EQUALIZATION

BACKGROUND

1. Technical Field

This disclosure generally relates to data communication. More specifically, this disclosure relates to methods and systems for performing adaptive equalization.

2. Related Art

The signal received at a receiver is usually noisy and distorted. Linear equalization is a powerful technique that can be used at the receiver to compensate for channel loss. However, for an equalizer to be guaranteed to improve the system performance, it must be adapted and/or optimized.

Unfortunately, adapting and/or optimizing an equalizer can be challenging because of a few reasons. First, adaptation schemes are not always guaranteed to converge. Specifically, interactions between the adaptation scheme and timing recovery can cause the adaptation scheme to diverge and degrade the system performance. Second, adaptation schemes typically require additional analog circuitry in the receiver front end to generate the optimization statistics. For example, an extra voltage slicer is typically required for this purpose.

SUMMARY

Some embodiments of the present invention provide systems and techniques for adapting and/or optimizing an equalizer of a receiver. The equalizer can receive an input signal, and the equalized input signal can then be provided as input to clock and data recovery (CDR) circuitry. The information used by the CDR circuitry for performing clock and data recovery can be used to adapt and/or optimize the equalizer.

Specifically, the equalizer's behavior can be adjusted by modifying one or more equalization parameters. At the beginning of an adaptation and/or optimization process, the system can determine initial values for the one or more equalization parameters. The system can then iteratively adjust the one or more equalization parameters to adapt and/or optimize the equalizer. Specifically, in each iteration, the system can use the receiver's CDR circuitry to determine the number of early and late data transitions associated with one or more data patterns (e.g., data patterns 001 and 110). Next, the system can adjust the one or more equalization parameters so that, for each data pattern in the one or more data patterns, the ratio between the number of early data transitions and the number of late data transitions is substantially equal to a desired value.

The eye width is substantially maximized when, for each data pattern, the number of early data transitions is substantially equal to the number of late data transitions (i.e., the ratio is equal to one). In some embodiments, the system can adjust the equalization parameters to substantially maximize the eye height. For example, if a slight over-equalization is expected to maximize eye height, then the system can adjust equalization parameters so that the ratio between the number of early data transitions and the number of late data transitions is greater than one.

Note that the term "early data transition" refers to the situation in which the data transition occurs before the edge of the sampling clock, and the term "late data transition" refers to the situation in which the data transition occurs after the edge of the sampling clock. Note that the terms "early" and "late" may be interpreted differently in CDR parlance. Specifically, in CDR parlance, whether a phase decision is "early" or "late" is based on the clock's point of view. Hence, if the phase decision is "early," it means that the clock edge was earlier than the data transition. In other words, an "early" phase decision corresponds to a "late data transition," and a "late" phase decision corresponds to an "early data transition."

In some embodiments, the system determines robust initial values for the adaptation and/or optimization process. Specifically, the system can determine the initial values for the one or more equalization parameters by first determining a set of settings for the one or more equalization parameters, wherein each setting includes value assignments for the one or more equalization parameters which cause the receiver's CDR circuitry to lock on the input signal. Next, the system uses the set of settings to determine a range of values for each equalization parameter. For example, the system can sweep the equalization parameters across their respective ranges and determine the range of values for each parameter that causes the CDR circuitry to lock. The system can then determine a median value for each equalization parameter based on the range of values that causes the CDR circuitry to lock. Finally, the system can use the median value for each equalization parameter as the initial value for the adaptation and/or optimization process. Starting the adaptation and/or optimization process from these robust initial values ensures that the process causes the equalizer to converge to a substantially optimal setting.

In some embodiments, the system uses a binary phase detector in the CDR circuitry to determine the number of early and late data transitions associated with the one or more data patterns. The binary phase detector can be a bang-bang phase detector. Note that the equalizer is under-equalized for a data pattern if the number of early data transitions is less than the number of late data transitions, and the equalizer is over-equalized for a data pattern if the number of early data transitions is greater than the number of late data transitions.

In some embodiments, the system adjusts the one or more equalization parameters based on early/late transition information for each data pattern. Specifically, if the ratio between the number of early data transitions and the number of late data transitions is greater than the desired value, the system can adjust the one or more equalization parameters to cause data transitions to occur later. Conversely, if the ratio between the number of early data transitions and the number of late data transitions is less than the desired value, the system can adjust the one or more equalization parameters to cause data transitions to occur earlier. If the ratio between the number of early data transitions and the number of late data transitions is substantially equal to the desired value, the system does not adjust the one or more equalization parameters.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Figure 1:
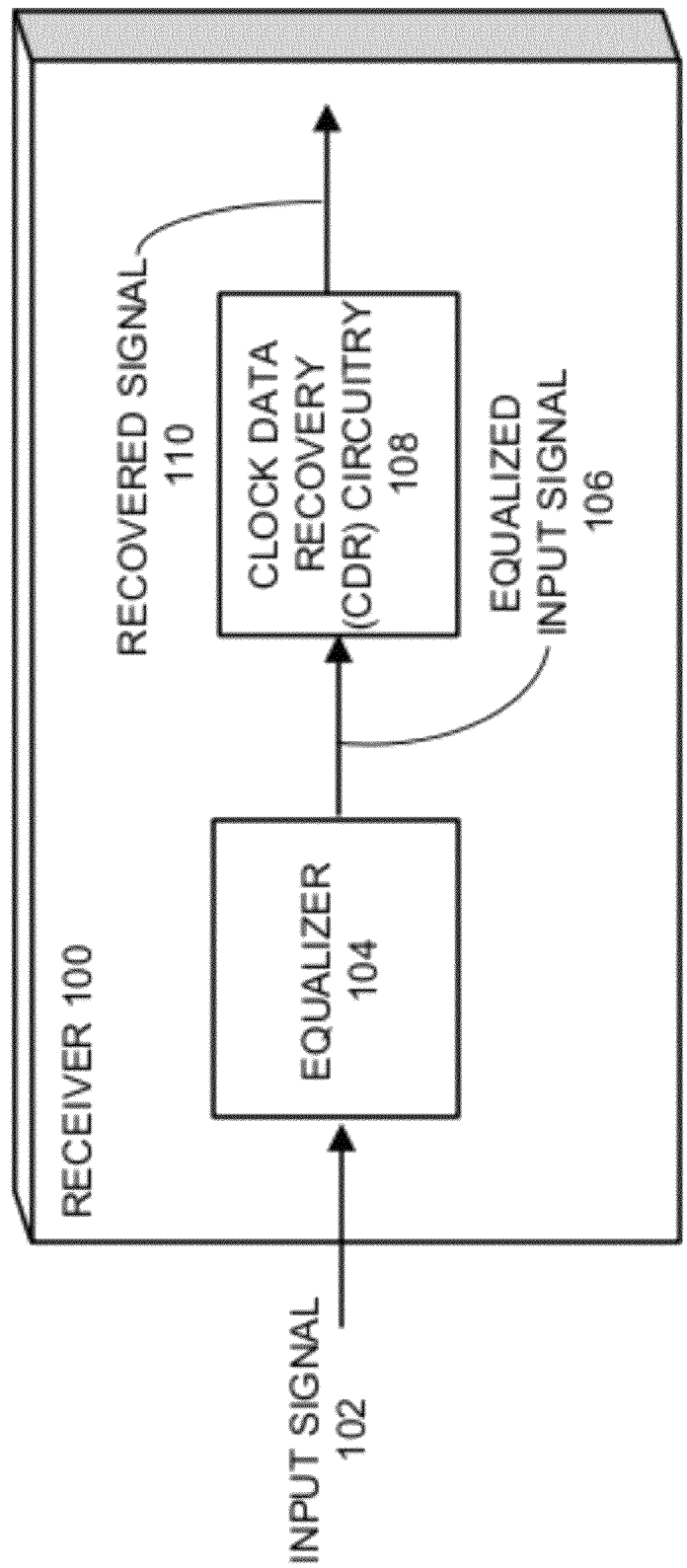
FIG. 1 illustrates a receiver in a digital communication system.

FIG. 1 illustrates a receiver 100 in a digital communication system. As illustrated in FIG. 1, receiver 100 includes an equalizer 104 at the front end to receive an input signal 102. Input signal 102 was transmitted from a transmitter over a communication channel. By the time input signal 102 is received at receiver 100, it may be distorted and contain noise due to the non-ideal characteristics of the communication channel. Equalizer 104 (or equalization circuitry) is designed to perform equalization on input signal 102 to counter these effects. Equalizer 104 outputs an equalized input signal 106, which is then fed into clock data recovery (CDR) circuitry 108.

CDR circuitry 108 is designed to sample the equalized input signal 106 in the middle of the data eye and output a recovered signal 110. To ensure that data sampling takes place in the middle of the data eye, CDR circuitry 108 samples the signal near the data transition. By comparing the phase information in the vicinity of the data transition with the data bits, CDR circuitry 108 can determine whether the data sampling is too early or too late and adjusts the sampling location accordingly to keep it in the middle of the eye.

CDR circuitry 108 can include a set of data slicers, a set of phase slicers, a deserializer, and a clock recovery unit. The clock recovery unit may include an analog phase-locked loop (PLL), which can include a bang-bang phase detector, a charge pump loop filter (CPLF), and a voltage-controlled oscillator (VCO). Further details of CDR circuitry can be found in "A Digital Clock and Data Recovery Architecture for Multi-Gigabit/s Binary Links," by Jeff L. Sonntag and John Stonick, *IEEE Journal of Solid-State Circuits*, vol. 41, no. 8, August 2006, pp. 1867-75, which is incorporated herein by reference.

In some embodiments of the present invention, CDR circuitry 108 uses a binary phase detector, such as a bang-bang phase detector, to generate early/late statistics from equalized input signal 106. This binary phase detector samples equalized input signal 106 at nominal data and phase sampling points and uses digital logic to produce early/late decisions based upon the relationship between the data and the phase samples. More specifically, the binary phase detector outputs non-zero values (either+1 or −1) for data transitions in signal 106 and outputs a zero value for non-transitions. In one embodiment, the digital logic of the binary phase detector generates the early/late decisions as follows. If a phase sample agrees with a preceding data sample, the phase decision is "early" (which is equivalent to a "late data transition"). On the other hand, if the phase sample agrees with the next data bit, the phase sample is "late" (which is equivalent to an "early data transition").

The following table provides a phase error decoding table for a data transition based on the operation of the above-described binary phase detector. In the table, $p_n$ is a phase sample produced from the data transition, $d_{n-1}$ represents the data sample collected immediately before phase sample $p_n$, and $d_n$ represents the data sample collected immediately after phase sample $p_n$.

| $d_{n-1}$ | $P_n$ | $d_n$ | DECISION |
|---|---|---|---|
| −1 | −1 | 1 | EARLY (−1) |
| 1 | 1 | −1 | |
| −1 | 1 | 1 | LATE (+1) |
| 1 | −1 | −1 | |
| −1 | X | −1 | NO DECISION (0) |
| 1 | X | 1 | |

Figure 2A:
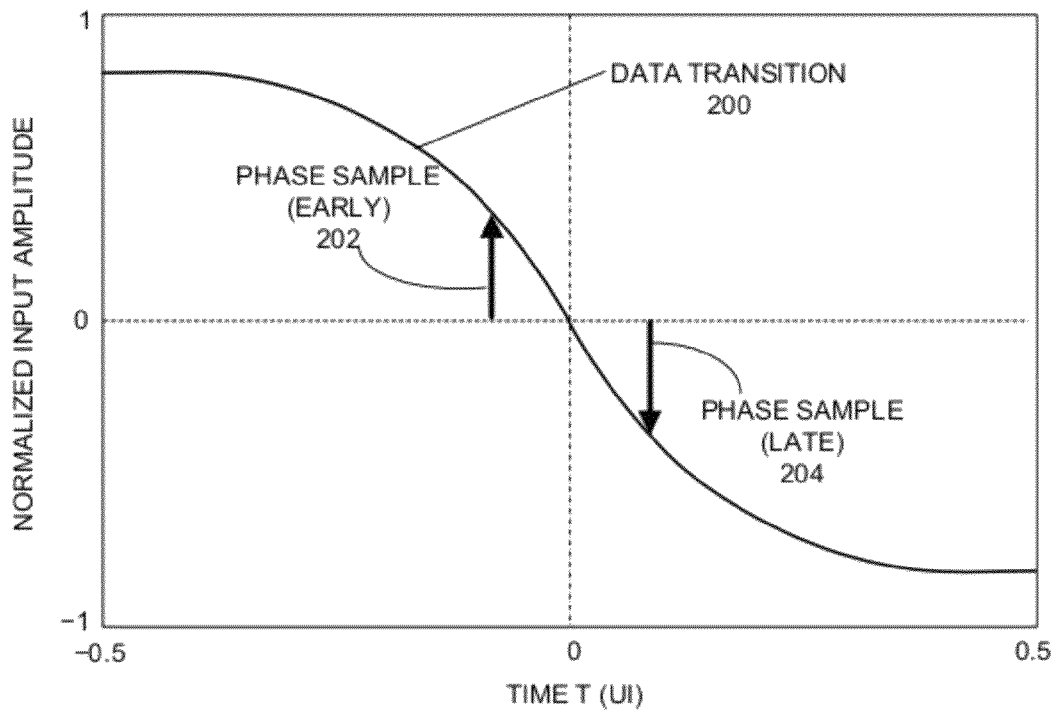
FIG. 2A illustrates early and late phase decisions.

FIG. 2A illustrates early and late phase decisions. As illustrated in FIG. 2A, phase sample 202 taken on falling data transition 200 produces a positive value+1, which is between two consecutive data samples+1 and −1. According to the above table, phase sample 202 is an "early phase decision" (which is equivalent to a "late data transition"). In contrast, phase sample 204 taken on transition 200 produces a negative value−1, which is between the same two data samples+1 and −1. According to the above table, phase sample 202 is a "late phase decision" (which is equivalent to an "early data transition").

Figure 2B:
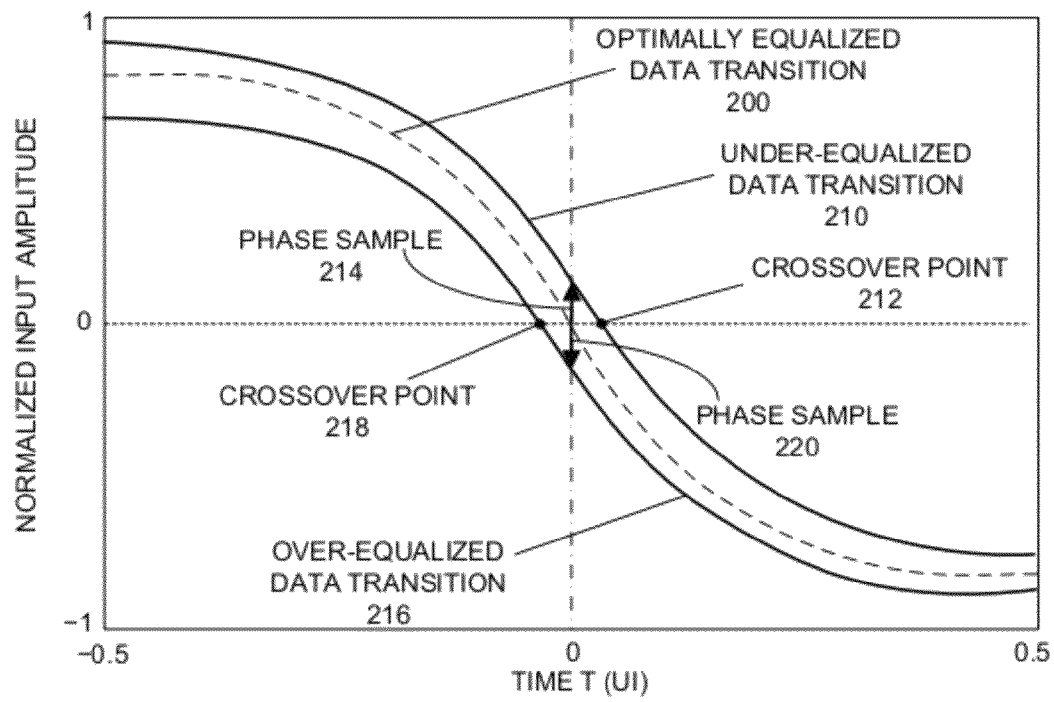
FIG. 2B illustrates under-equalized and over-equalized data transitions in accordance with some embodiments of the present invention.

FIG. 2B illustrates under-equalized and over-equalized data transitions in accordance with some embodiments of the present invention. As illustrated in FIG. 2B, crossover point 212 for under-equalized data transition 210 occurs later than the sampling clock edge (T=0). In this case, phase sample 214 taken at the sampling clock edge will generate an early phase decision. On the other hand, crossover point 218 for over-equalized data transition 216 occurs earlier than the sampling clock edge (T=0). In this case, phase sample 220 taken at the sampling clock edge will generate a late phase decision.

Note that, while the above discussion is based on a falling data transition, similar early/late decisions can be made for a rising data transition. That is, an under-equalized rising data transition will cross over after the sampling clock edge and result in an early phase decision, and an over-equalized rising data transition will cross over before the sampling clock edge and result in a late phase decision. Optimally equalized data transition 200 is expected to generate an equal number of early and late phase decisions because the crossover point substantially coincides with the sampling clock edge. These observations lead us to the following important insight: per-pattern statistics of early/late phase decisions can be used to optimize the equalization parameters by determining whether the signal is under or over-equalized for one or more data patterns.

Figure 3:
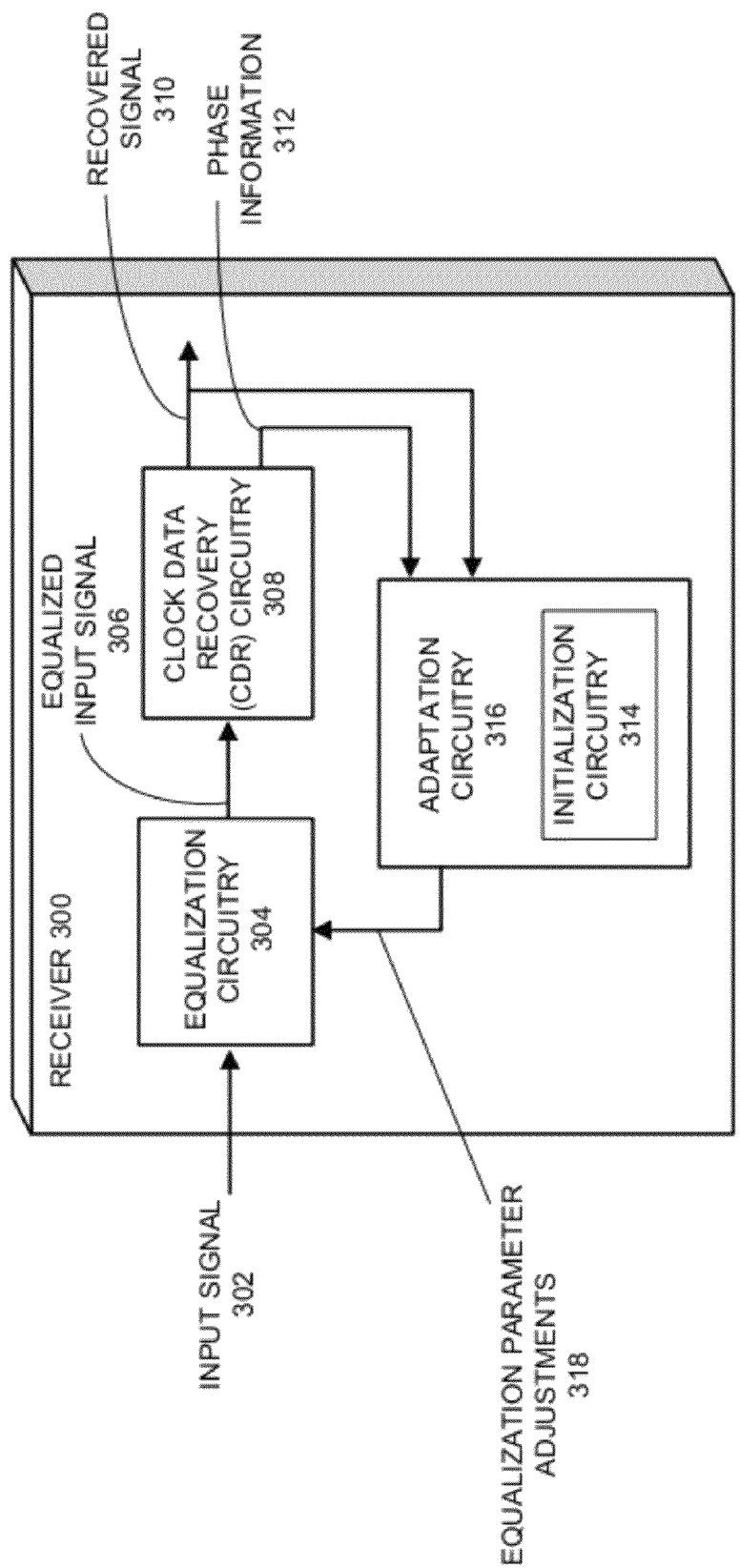
FIG. 3 illustrates a receiver in accordance with some embodiments of the present invention.

FIG. 3 illustrates a receiver in accordance with some embodiments of the present invention. Receiver 300 includes equalization circuitry 304 (or equalizer) which receives an input signal 302 and outputs an equalized input signal 306. Receiver 300 includes CDR circuitry 308 which samples equalized input signal 306 and outputs a recovered signal 310. CDR circuitry 308 also generates early/late phase information 312 for data transitions in equalized input signal 306. Receiver 300 additionally includes adaptation circuitry 316 (or optimization circuitry) which adapts or optimizes equalization circuitry 304 by adjusting one or more equalization parameters. Specifically, adaptation circuitry 316 can receive recovered signal 310 and phase information 312 to determine equalization parameter adjustments 318 which can then be used for adjusting the behavior of equalization circuitry 304.

Adaptation circuitry 316 can optionally include initialization circuitry 314 which determines a robust starting point for the adaptation and/or optimization process. In some embodiments, initialization circuitry 314 is a separate module, i.e., it is not part of adaptation circuitry 316 as shown in FIG. 3. Initialization circuitry 314 can exhaustively sweep the settings of one or more equalization parameters of equalization circuitry 304. Phase information 312 can also include information about whether CDR circuitry 308 was able to lock on the equalized input signal 306 or not. Initialization circuitry 314 can use the lock information to determine desirable starting conditions for the subsequent adaptation process.

Once robust starting conditions are found, adaptation circuitry 316 can perform an iterative adaptation process to adapt and/or optimize the equalization. Specifically, adaptation circuitry 316 can keep track of early/late phase decisions for one or more data patterns. Next, adaptation circuitry 316 can determine if the equalizer is under-equalized or over-equalized based on the early/late phase information and adjust the equalization parameters so that the equalization is neither under nor over-equalized. Specifically, in some embodiments, the system can adjust the equalization parameters so that the system is slightly over-equalized to maximize eye height.

Figure 4:
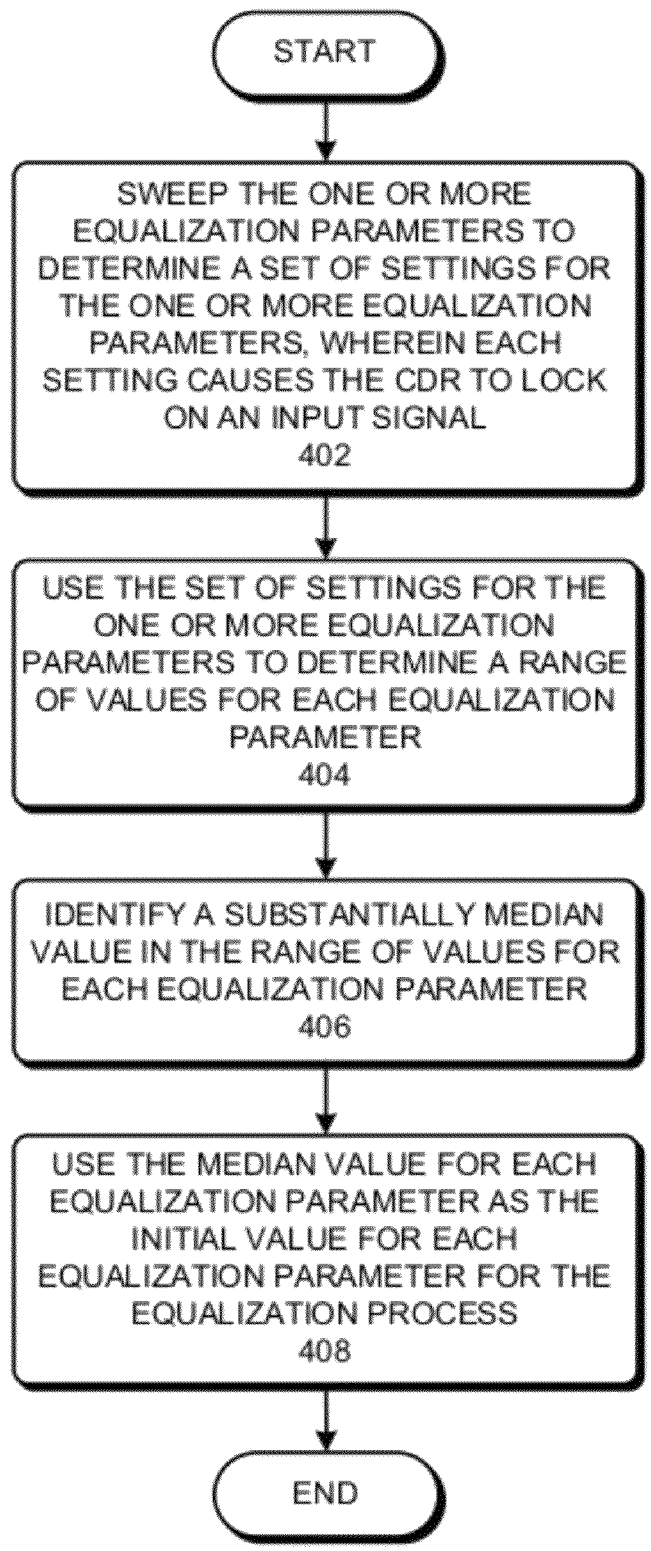
FIG. 4 presents a flowchart that illustrates a process for determining an initial condition for an equalizer in accordance with some embodiments of the present invention.

FIG. 4 presents a flowchart that illustrates a process for determining an initial condition for an equalizer in accordance with some embodiments of the present invention.

The system can begin by sweeping the one or more equalization parameters to determine a set of settings for the one or more equalization parameters, wherein each setting includes value assignments for the one or more equalization parameters which cause the receiver's CDR circuitry to lock on the input signal (step 402). Specifically, initialization circuitry 314 can sweep the one or more equalization parameters. At each setting, CDR circuitry 308 can determine if a lock was successful on equalized input signal 306, and provide this lock information to initialization circuitry 314.

The system can then use the set of settings for the one or more equalization parameters to determine a range of values for each equalization parameter (step 404). In one embodiment, the system determines the range for a given equalization parameter based on the minimum and the maximum value for the equalization parameter for which the CDR locked. Next, for each equalization parameter, the system can identify a substantially median value in the range of values for each equalization parameter (step 406). The system can then use the median value for each equalization parameter as the initial value for each equalization parameter for the equalization process (step 408).

Figure 5:
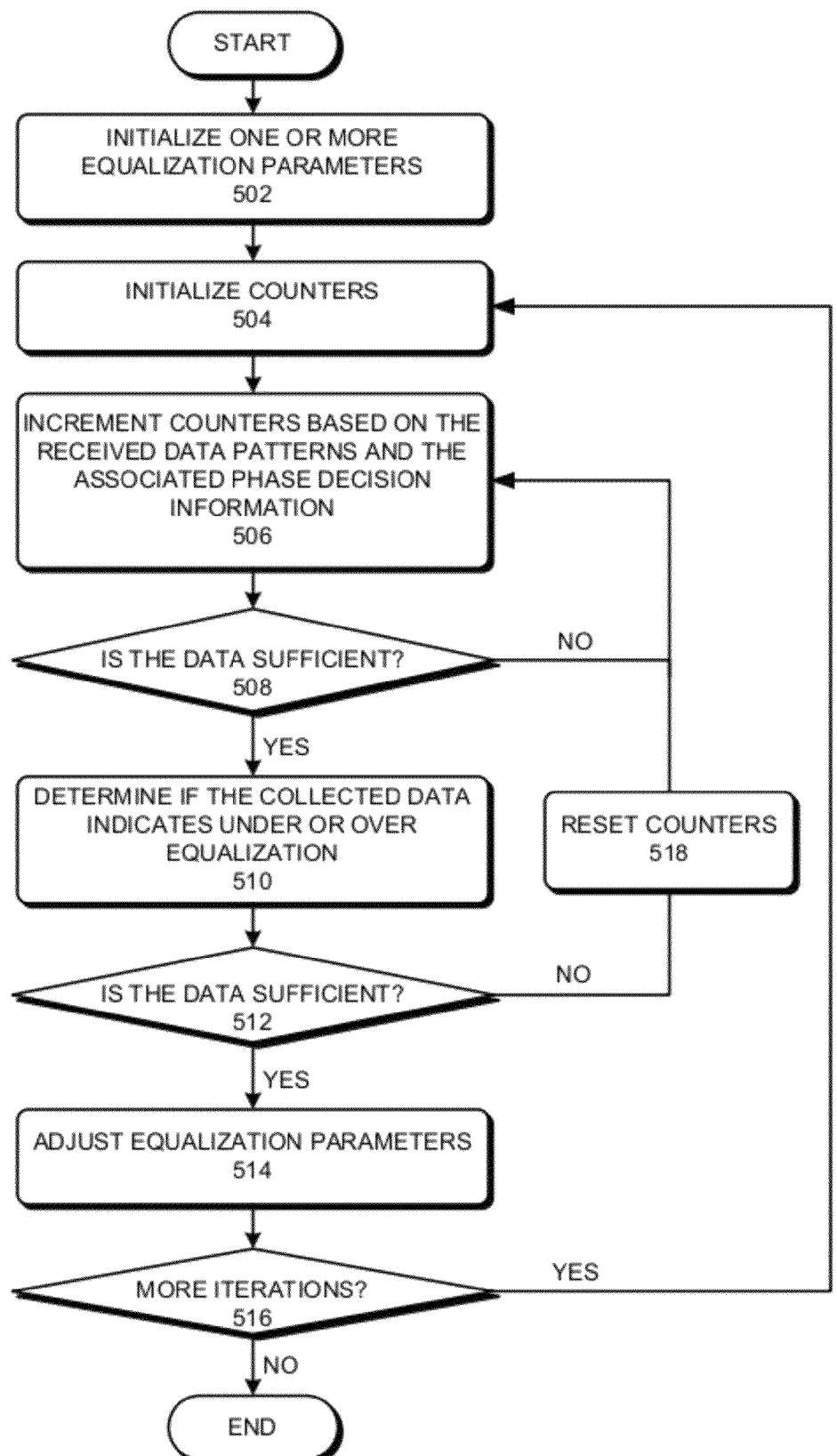
FIG. 5 presents a flowchart that illustrates a process for optimizing one or more equalization parameters in accordance with some embodiments of the present invention.

FIG. 5 presents a flowchart that illustrates a process for optimizing one or more equalization parameters in accordance with some embodiments of the present invention. The process shown in FIG. 5 is for illustration purposes only and is not intended to limit the scope of the present invention.

In some embodiments, the system uses a boost parameter to adapt and/or optimize equalization for data patterns 001 and 110. The boost parameter can determine the amount by which the sampled value of the input signal is adjusted based on one or more previous samples. Specifically, if d(n) is the value of the sampled input signal at discrete time n, then, in some embodiments, the sampled equalized signal e(n) can be represented as $e(n)=d(n)+b \cdot d(n-1)$, where b is the boost parameter. It will be apparent that multiple equalization parameters can be used to implement a more complex equalization scheme.

The adaptation and/or optimization process can begin by initializing one or more equalization parameters (step 502). Specifically, the system can determine a range of values for the boost parameter which cause the CDR to lock, and use the median of the range as the initial value for the boost parameter. If more than one equalization parameter is used, the system can determine whether the CDR locks under multiple combinations of equalization parameter values and initialize each equalization parameter to the median or average value of its lock range. In some embodiments, after initializing the equalization parameters, the system waits for a predetermined amount of time for the CDR to lock, and then begins the iterative optimization process.

The system can start the iterative optimization process by initializing counters (step 504). Specifically, the counters can include: (1) a data pattern occurrence counter suff_stat_ctr, which is used to track the number of occurrences of a type of data pattern (e.g., 001 or 110); (2) an early counter early_ctr, which is used to track the number of early phase decisions for a type of data pattern; (3) a loop counter loop_ctr to keep track of the number of statistic gathering loops that have been performed; (4) an adaptation counter adapt_ctr to determine whether the equalization parameters need to be adjusted or not; and (5) a master counter mstr_ctr to keep track of the number of iterative optimization adjustments that have been performed. Note that, if multiple types of data patterns are being tracked, the system can use a pair of suff_stat_ctr and early_ctr counters for each type of data pattern.

The system can then increment counters based on the received data patterns and the associated phase decision information (step 506). For example, when the system detects the occurrence of data patterns 001 or 110, the system can increment the occurrence counter suff_stat_ctr by one. Additionally, for each type of data pattern, the system can increment the early counter early_ctr by one if the associated phase decision was early.

Note that the early/late phase information is used by the CDR circuitry for performing clock and data recovery. The adaptation process reuses the phase information for adapting and/or optimizing the equalizer. As a result, some embodiments of the present invention require a minimal amount of additional hardware to perform adaptation and/or optimization of the equalizer. Specifically, since these embodiments reuse the phase information generated by the CDR circuitry, they do not require any additional data or phase slicers above and beyond those that are already present in the CDR circuitry.

The system then determines if a sufficient amount of data has been collected (step 508). For example, the system can determine if suff_stat_ctr has reached a predetermined value S. If a sufficient amount of data has not been collected, the system can continue tracking the data patterns and collecting statistics.

On the other hand, if a sufficient amount of data has been collected, the system can determine whether the collected data indicates under or over-equalization (step 510). For example, the system can increment loop counter loop_ctr by one to keep track of the number of under- or over-equalization data points that the system has gathered. The system can also increment adaptation counter adapt_ctr by one if more than half of the phase decisions are early decisions (i.e., if early_ctr > ½×suff_stat_ctr).

The system next determines if a sufficient amount of data has been collected (step 512) to determine an adjustment for the one or more equalization parameters. Specifically, the system may collect a certain number of under- or over-equalization data points before determining how to adjust the equalization parameters. For example, the system can determine whether loop counter loop_ctr has reached a predetermined value L. If not, the system can reset counters (step 518) and collect more data by returning to step 506. For example, the system can reset counters suff_stat_ctr and early_ctr and return to step 506 to collect more data.

On the other hand, if a sufficient number of data points have been collected, the system can adjust the equalization parameters (step 514). In general, the system can adjust the equalization parameters so that a desired ratio between the number of early phase decisions and late phase decisions is achieved.

For example, if the number of early phase decisions is desired to be substantially equal to the number of late phase decisions (i.e., the desired value for the ratio is one), the system can adjust the one or more equalization parameters as follows: (1) if adapt_ctr=L/2, then do not change the value of the one or more equalization parameters; (2) if adapt_ctr<L/2, then adjust the one or more equalization parameters so that the phase decision is more likely to be early; and (3) if adapt_ctr>L/2, then adjust the one or more equalization parameters so that the phase decision is more likely to be late. Specifically, increasing the magnitude of the boost parameter can increase the amount of equalization, thereby causing the phase decision to be late. Conversely, decreasing the magnitude of the boost parameter can decrease the amount of equalization, thereby causing the phase decision to be early.

In some embodiments, the system can adjust the equalization parameters by a fixed increment. In other embodiments, the system can adjust the equalization parameters by a variable increment which is determined based on the amount of discrepancy between the current equalizer behavior and the desired equalizer behavior. For example, the system can make a bigger or smaller adjustment to the one or more equalization parameters based on the value of the adaptation counter adapt_ctr. Specifically, if adapt_ctr is much higher or much lower than L/2, the equalization parameters can be adjusted by a large increment. On the other hand, if adapt_ctr is close to L/2, a small adjustment can be made to the one or more equalization parameters.

The system can then determine if more optimization iterations are required (step 516). If so, the system can return to step 504. Otherwise, the system can end the optimization process.

In some embodiments, the system can perform a fixed number of optimization iterations. For example, in step 516, the system can determine if the master counter mstr_ctr has reached a predetermined value M. In other embodiments, the system can terminate the iterative optimization if the equalization parameters did not change in this iteration, or if the system detects that the optimization parameters are "ping-ponging" between two or more substantially optimal sets of values.

The adaptation and/or optimization process can be performed at the beginning, or periodically during normal operation. In some embodiments, the system can continuously perform the adaptation and/or optimization process.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing an equalizer of a receiver, wherein the equalizer's behavior can be adjusted by modifying one or more equalization parameters, the method comprising:
    determining initial values for the one or more equalization parameters; and
    iteratively adjusting the one or more equalization parameters, wherein each iteration includes:
        using the receiver's clock and data recovery (CDR) circuitry to determine the number of early and late data transitions associated with one or more data patterns in an input signal; and
        adjusting the one or more equalization parameters so that, for each data pattern in the one or more data patterns, the ratio between the number of early data transitions and the number of late data transitions is substantially equal to a desired value.

2. The method of claim 1, wherein determining the initial values for the one or more equalization parameters involves:
    determining a set of settings for the one or more equalization parameters, wherein each setting includes value assignments for the one or more equalization parameters which causes the receiver's CDR circuitry to lock on the input signal;
    using the set of settings to determine a range of values for each equalization parameter;
    using the range of values for each equalization parameter to determine a substantially median value for each equalization parameter; and
    using the median value for each equalization parameter as the initial value for each equalization parameter.

3. The method of claim 1, wherein determining the number of early and late data transitions associated with the one or more data patterns involves using a binary phase detector in the CDR circuitry.

4. The method of claim 3, wherein the binary phase detector is a bang-bang phase detector.

5. The method of claim 1, wherein adjusting the one or more equalization parameters involves:
for each data pattern in the one or more data patterns:
if the ratio between the number of early data transitions and the number of late data transitions is greater than the desired value, adjusting one or more equalization parameters to cause data transitions to occur later;
if the ratio between the number of early data transitions and the number of late data transitions is less than the desired value, adjusting one or more equalization parameters to cause data transitions to occur earlier; and
if the ratio between the number of early data transitions and the number of late data transitions is substantially equal to the desired value, not adjusting the one or more equalization parameters.

6. The method of claim 1,
wherein the equalizer is under-equalized for a data pattern if the number of early data transitions is less than the number of late data transitions; and
wherein the equalizer is over-equalized for the data pattern if the number of early data transitions is greater than the number of late data transitions.

7. The method of claim 1, wherein the one or more data patterns include binary data patterns 001 and 110.

8. A receiver, comprising:
equalization circuitry configured to equalize an input signal, wherein the equalization circuitry's behavior is adjustable by modifying one or more equalization parameters;
clock and data recovery (CDR) circuitry;
initialization circuitry configured to determine initial values for the one or more equalization parameters; and
adaptation circuitry configured to iteratively adjust the one or more equalization parameters, wherein in each iteration, the adaptation circuitry is configured to:
use data transition information from the CDR circuitry to determine the number of early and late data transitions associated with one or more data patterns in the input signal; and
adjust the one or more equalization parameters so that, for each data pattern in the one or more data patterns, the ratio between the number of early data transitions and the number of late data transitions is substantially equal to a desired value.

9. The receiver of claim 8, wherein the initialization circuitry is configured to:
determine a set of settings for the one or more equalization parameters, wherein each setting includes value assignments for the one or more equalization parameters which causes the CDR circuitry to lock on the input signal;
use the set of settings to determine a range of values for each equalization parameter;
use the range of values for each equalization parameter to determine a substantially median value for each equalization parameter; and
use the median value for each equalization parameter as the initial value for each equalization parameter.

10. The receiver of claim 8, wherein the CDR circuitry uses a binary phase detector to determine the number of early and late data transitions associated with the one or more data patterns.

11. The receiver of claim 10, wherein the binary phase detector is a bang-bang phase detector.

12. The receiver of claim 8, wherein the adaptation circuitry is configured to:
for each data pattern in the one or more data patterns:
if the ratio between the number of early data transitions and the number of late data transitions is greater than the desired value, adjust one or more equalization parameters to cause data transitions to occur later;
if the ratio between the number of early data transitions and the number of late data transitions is less than the desired value, adjust one or more equalization parameters to cause data transitions to occur earlier; and
if the ratio between the number of early data transitions and the number of late data transitions is substantially equal to the desired value, not adjust the one or more equalization parameters.

13. The receiver of claim 8,
wherein the equalizer is under-equalized for a data pattern if the number of early data transitions is less than the number of late data transitions; and
wherein the equalizer is over-equalized for the data pattern if the number of early data transitions is greater than the number of late data transitions.

14. The receiver of claim 8, wherein the one or more data patterns include binary data patterns 001 and 110.

15. A communication system, comprising:
a transmitter; and
a receiver coupled to the transmitter via a communication channel, wherein the receiver comprises:
equalization circuitry configured to equalize a received signal, wherein the equalization circuitry's behavior is adjustable by modifying one or more equalization parameters;
clock and data recovery (CDR) circuitry;
initialization circuitry configured to determine initial values for the one or more equalization parameters; and
adaptation circuitry configured to iteratively adjust the one or more equalization parameters, wherein in each iteration, the adaptation circuitry is configured to:
use data transition information from the CDR circuitry to determine the number of early and late data transitions associated with one or more data patterns in the received signal; and
adjust the one or more equalization parameters so that, for each data pattern in the one or more data patterns, the ratio between the number of early data transitions and the number of late data transitions is substantially equal to a desired value.

16. The communication system of claim 15, wherein the initialization circuitry is configured to:
determine a set of settings for the one or more equalization parameters, wherein each setting includes value assignments for the one or more equalization parameters which causes the CDR circuitry to lock on the received signal;
use the set of settings to determine a range of values for each equalization parameter;
use the range of values for each equalization parameter to determine a substantially median value for each equalization parameter; and
use the median value for each equalization parameter as the initial value for each equalization parameter.

17. The communication system of claim 15, wherein the CDR circuitry uses a binary phase detector to determine the number of early and late data transitions associated with the one or more data patterns.

18. The communication system of claim 17, wherein the binary phase detector is a bang-bang phase detector.

19. The communication system of claim 15, wherein the adaptation circuitry is configured to:

for each data pattern in the one or more data patterns:

if the ratio between the number of early data transitions and the number of late data transitions is greater than the desired value, adjust one or more equalization parameters to cause data transitions to occur later;

if the ratio between the number of early data transitions and the number of late data transitions is less than the desired value, adjust one or more equalization parameters to cause data transitions to occur earlier; and if the ratio between the number of early data transitions and the number of late data transitions is substantially equal to the desired value, not adjust the one or more equalization parameters.

20. The communication system of claim 15, wherein the equalizer is under-equalized for a data pattern if the number of early data transitions is less than the number of late data transitions; and wherein the equalizer is over-equalized for the data pattern if the number of early data transitions is greater than the number of late data transitions.

21. The communication system of claim 15, wherein the one or more data patterns include binary data patterns 001 and 110.

* * * * *